(12) United States Patent
Hirata

(10) Patent No.: US 6,410,116 B1
(45) Date of Patent: Jun. 25, 2002

(54) OPTICAL INFORMATION MEDIUM AND ITS FABRICATION PROCESS

(75) Inventor: Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/531,457

(22) Filed: Mar. 20, 2000

(30) Foreign Application Priority Data

Mar. 19, 1999 (JP) .......................................... 11-076963

(51) Int. Cl.[7] ................................................ B32B 3/02
(52) U.S. Cl. ................. 428/64.1; 428/64.2; 430/270.11
(58) Field of Search .............................. 428/64.1, 64.2, 428/64.4, 457, 913; 430/270.11, 270.12, 495.1, 945; 369/283, 288

(56) References Cited

U.S. PATENT DOCUMENTS

| | | | | |
|---|---|---|---|---|
| 5,573,831 A | * | 11/1996 | Suzuki | ........................ 428/64.1 |
| 5,599,649 A | * | 2/1997 | Shinkai | .................. 430/270.11 |
| 6,278,683 B1 | * | 8/2001 | Hayashi | .................... 369/275.5 |

FOREIGN PATENT DOCUMENTS

| | | |
|---|---|---|
| JP | 9-161333 | 6/1997 |
| JP | 10-269624 | 10/1998 |
| JP | 10-283683 | 10/1998 |

* cited by examiner

*Primary Examiner*—Elizabeth Evans Mulvaney
(74) *Attorney, Agent, or Firm*—Oblon, Spivak, McClelland, Maier & Neustradt, P.C.

(57) ABSTRACT

An optical information medium comprises a supporting substrate, an information recording surface 4 on the supporting substrate and a light-transmitting layer of resin on the information recording surface. Recording light and/or reproducing light are incident on the information recording surface through the light-transmitting layer. The light-transmitting layer is obtained by curing a resin layer containing an ultraviolet-curing cationic resin. If the light-transmitting layer is formed by repeating the cycle of resin coating and curing or drying a plurality of times, the uniformity of thickness of the light-transmitting layer can be much more improved and the amount of warpage can be much more reduced. Repetition of the cycle of resin coating and curing or drying is also effective for resins other than the ultraviolet-curing cationic resin.

11 Claims, 1 Drawing Sheet

RECORDING AND REPRODUCING LIGHT

OPTICAL INFORMATION MEDIUM AND ITS FABRICATION PROCESS

BACKGROUND OF THE INVENTION

The present invention relates to an optical information medium such as read only optical disks and optical recording disks and its fabrication process.

In recent years, optical information media such as read only optical disks and optical recording disks have been required to have ever-higher recording densities and, hence, ever-higher capacities so as to record or store an enormous amount of information such as moving image information. To meet this requirement, media having such high recording densities are now under extensive and intensive research and development.

According to one of approaches proposed so far to this end, recording and reproducing wavelengths are shortened while the numerical aperture (NA) of an objective in a recording and reproducing optical system is increased, thereby reducing the diameter of recording and reproducing laser beams, as typically practiced in the case of a digital versatile disk or DVD. When the recording and reproducing wavelength is decreased from 780 nm down to 650 nm and the NA is increased from 0.45 up to 0.6, the recording capacity of the DVD is 4.7 GB/surface or 6 to 8 times as large as that of a CD.

As the NA increases, however, the tilt margin decreases. The tilt margin is the tolerance of the tilt of an optical recording medium with respect to an optical system, and is determined by the NA. Here let $\lambda$ be a recording and reproducing wavelength and t be the thickness of a transparent substrate on which recording and reproducing light is incident. Then, the tilt margin is proportional to:

$$\lambda/(t \cdot NA^3)$$

As the optical recording medium tilts with respect to a laser beam, wavefront aberration (coma) occurs. Here let n denote the refractive index of the substrate and $\theta$ stand for the angle of tilt. Then, the wavefront aberration coefficient is given by:

$$(\tfrac{1}{2}) \cdot t \cdot \{n^2 \cdot \sin\theta \cdot \cos\theta\} \cdot NA^3/(n^2 - \sin^2\theta)^{-5/2}$$

From these expressions, it is understood that the thickness t of the substrate should preferably be reduced to increase the tilt margin and prevent the occurrence of coma. In a DVD, indeed, the tilt margin is ensured by making the thickness of the substrate about half (ca. 0.6 mm) the thickness (ca. 1.2 mm) of the substrate of a CD. On the other hand, the thickness variation margin for the substrate is given by:

$$\lambda/NA^4$$

When there a thickness variation in the substrate, another wavefront aberration (spherical aberration) occurs. Here let $\Delta t$ be the thickness variation of the substrate. Then, the spherical aberration coefficient is given by:

$$\{(n^2-1)/8n^3\} \cdot NA^4 \cdot \Delta t$$

From these expressions, it is understood that to reduce the spherical aberration produced with an increasing NA, it is required to reduce the thickness variation as much as possible. For instance, $\Delta t$ is of the order of $\pm 100\ \mu m$ in the case of a CD whereas $\Delta t$ is limited to $\pm 30\ \mu m$ in the case of a DVD.

To record moving images of higher quality over an extended period of time, a structure enabling a substrate to become thinner has been put forward in the art. According to this structure, a substrate having an ordinary thickness is used as a supporting substrate for maintaining rigidity. Pits or a recording layer are formed on the surface of the substrate. A light-transmitting layer of about 0.1 mm in thickness is provided as a thin substrate on the recording layer, so that recording and reproducing light can be incident on the recording layer through the light-transmitting layer. With this structure, it is possible to achieve an ever-higher NA and, hence, an ever-higher recording density, because the substrate can be made much thinner than could be possible with conventional structures.

However, it is very difficult to form the light-transmitting layer used for this structure, using resin injection molding. To eliminate such difficulty, it has been proposed to form such a light-transmitting layer by spin-coating of an ultraviolet-curing resin, as typically disclosed in JP-A 9-161333. In JP-A 10-269624, it is proposed to coat a dispersion of spacer particles in a photo-curing resin on a substrate and press the dispersion down on the substrate with a plate material, thereby forming a light-transmitting layer of uniform thickness. In JP-A 10-283683, it is proposed to bond an ultraviolet-curing resin onto a light-transmitting sheet.

When a light-transmitting layer is formed by the processes set forth in the aforesaid publications, however, a medium warping problem arises due to shrinkage upon curing of the resin forming part of the light-transmitting layer. When the photo-curing resin is configured into a film of about 0.1 mm in thickness, it is difficult to achieve uniform curing in the thickness direction. As a result, the light-transmitting layer lacks optical uniformity, and the reliability of the medium is likely to become low due to the presence of uncured monomers. According to the process shown in the aforesaid JP-A 10-283683, the ultraviolet-curing resin layer is thinner than those obtained by other processes because the ultraviolet-curing resin is used as an adhesive layer, and so the medium is less susceptible to warpage. However, the distortion by shrinkage of the resin upon ultraviolet curing leads to another problem that the index of birefringence of the light-transmitting sheet becomes large.

SUMMARY OF THE INVENTION

An object of the present invention is to provide an optical information medium comprising a supporting substrate, an information-recording surface provided on a surface of said supporting substrate and a light-transmitting layer provided on said information-recording surface and formed of a resin, wherein said light-transmitting layer is allowed to have a uniform thickness so that optical heterogeneity of the light-transmitting layer in its thickness direction can be reduced, and any warping of the optical information medium is prevented.

Such an object is achievable by the inventions recited below as (1) to (4).

(1) An optical information medium comprising a supporting substrate, an information-recording surface provided on the supporting substrate and a light-transmitting layer provided on the information-recording surface, with recording light and/or reproducing light incident on the information-recording surface through the light-transmitting layer, wherein:
said light-transmitting layer is obtained by curing a resin layer containing an ultraviolet-curing cationic resin.

(2) The optical information medium according to any one of (1) above, wherein said light-transmitting layer has a thickness of 30 to 300 $\mu m$.

(3) A process of fabricating an optical information medium comprising a supporting substrate, an information-recording surface provided on the supporting substrate and a light-transmitting layer provided on the information-recording surface, with recording light and/or reproducing light incident on the information-recording surface through the light-transmitting layer, wherein said light-transmitting layer is formed by repeating a cycle of resin coating and resin curing or drying a plurality of times.

(4) The fabrication process according to (3) above, wherein said resin contains an ultraviolet-curing cationic resin.

EMBODIMENTS OF THE INVENTION

Figure 1:
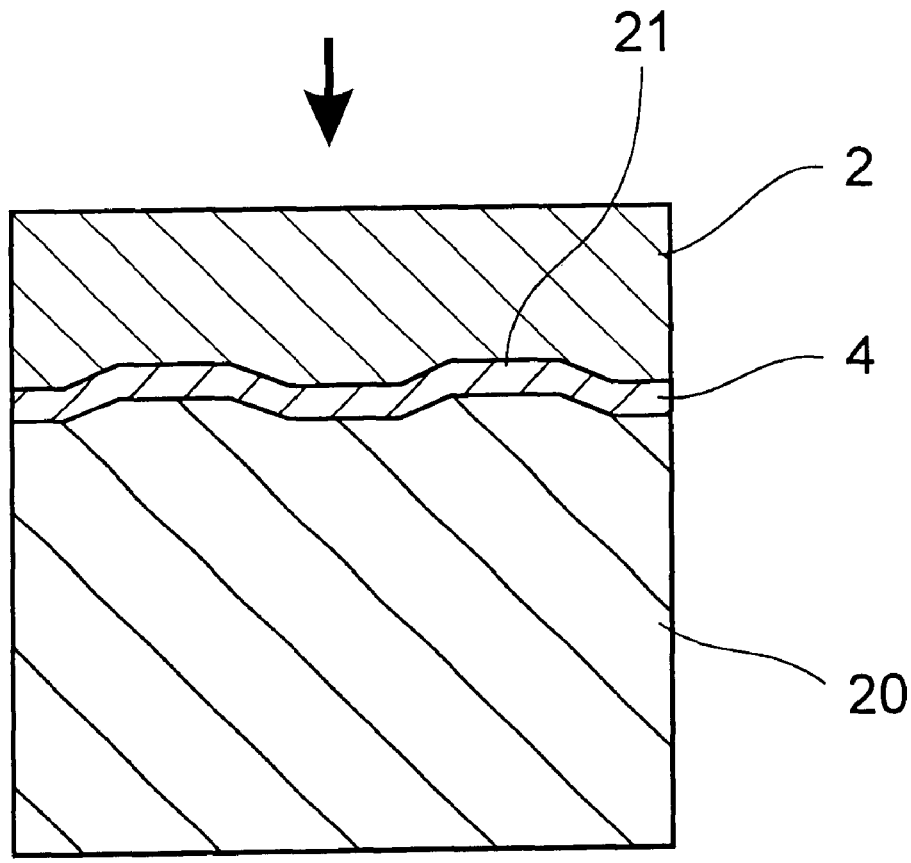
FIG. 1 is a partial sectional view of one embodiment of the optical information medium according to the invention.

One exemplary arrangement of the optical information medium according to the invention is shown in FIG. 1. This optical information medium is an information recording medium comprising a supporting substrate 20 and an information recording surface or a recording layer 4 provided on the supporting substrate 20. This recording layer 4 includes thereon a light-transmitting layer 2. Recording light and/or reproducing light are incident on the recording layer 4 through the light-transmitting layer 2. The present invention may be applied to every optical recording medium irrespective of the type of the recording layer: for instance, a phase change type recording medium, a pit type recording medium, and a magneto-optical recording medium. Usually, a dielectric layer and a reflective layer are provided on at least one side of the recording layer for the purposes of protecting the recording layer, ensuring optical effects, and so on, although not shown in FIG. 1. The present invention may also be applied to the read only type to say nothing of the recordable type shown in FIG. 1. In this case, rows of pits formed integrally with the supporting substrate 20 define the information-recording surface.

In the present invention, the light-transmitting layer 2 is formed by curing a resin layer containing an ultraviolet (UV)-curing cationic resin. The UV-curing cationic resin has several characteristic features, among which:

(1) curing proceeds even upon UV irradiation because of ionic polymerization (dark reaction), (2) the degree of shrinkage upon curing is limited, and (3) the rate of curing is relatively slow.

The feature (1) ensures that the light-transmitting layer is cured uniformly to the center in its thickness direction and so has high optical homogeneity in its thickness direction with no concern for a possible reliability drop due to monomers. The feature (2) makes the substrate unlikely to warp, and ensures that even with a thick light-transmitting layer, the adhesion of the light-transmitting layer to the substrate is less likely to drop. The feature (3) ensures that even when a thick multilayered light-transmitting layer is formed by wet-on-wet resin coating, good-enough adhesion is achieved between adjacent layers thereby ensuring homogeneity in the thickness direction.

The UV-curing cationic resin, for instance, include an epoxy resin, a vinyl ether compound and a cyclic ether compound which may all be used herein. However, it is particularly preferable to use the epoxy resin. The epoxy resin is broken down into bisphenol, novolak, alicyclic, aliphatic and other types, which may all be used herein. However, particular preference is given to the alicyclic type. While alicyclic resins may be used alone, they should preferably be used in an admixture form.

The resin layer prior to curing contains a photopolymerization initiator in addition to the UV-curing cationic resin. No particular limitation is imposed on the photopolymerization initiator used herein; for instance, a suitable selection may be made from aromatic diazonium salts, aromatic iodonium salts, aromatic sulfonium salts and metallocene compounds, among which the aromatic sulfonium salts are particularly preferred. It is then preferable that the amount of the photopolymerization initiator added with respect to the UV-curing cationic resin is between 0.1% by weight and 10% by weight.

The resin layer should preferably be formed by coating. No particular limitation is placed on coating processes; for instance, an appropriate selection may be made from spin coating, spray coating, roll coating, screen coating, die coating, curtain coating and dip coating processes, although the spin coating process is preferred.

For ultraviolet irradiation for the curing of the resin layer, an ordinary high-pressure mercury vapor lamp may be used.

The resin layer may be formed by one single cycle of coating and curing. However, it is preferable to make use of the fabrication process according to the invention, explained below.

According to the fabrication process of the invention, the light-transmitting layer is formed by repeating a cycle of resin coating and resin curing a plurality of times. Here the inventive process is compared with a conventional process wherein a light-transmitting layer having the same thickness is formed by one single cycle of resin coating and resin curing. With the inventive process, the light-transmitting layer can be cured uniformly to the center in its thickness direction and can have a uniform thickness. In addition, it is possible to reduce the warpage of the medium incidental to the curing of the light-transmitting layer.

In the process of the invention, the thickness of the resin layer formed by one cycle of coating and curing should be preferably between 1 $\mu$m and 40 $\mu$m, and more preferably between 5 $\mu$m and 20 $\mu$m. When the thickness of the resin layer per cycle becomes smaller, the quality of the film is likely to become worse because the coating material is repelled during coating. When the thickness of the resin layer per cycle becomes larger, on the other hand, the effect resulting from a plurality of coating and curing cycles becomes insufficient.

It is noted that when the coating and curing cycle is repeated a plurality of times, it is preferable that substantially the same thickness is obtained for each cycle. In this case, the effect of a plurality of coating cycles becomes prominent. The number of repetition of the coating and curing cycle is not critical to the practice of the invention. However, the number of repetition should be at least 3. There is no upper limit to the number of repetition as long as the thickness of the resin layer formed per cycle is within the aforesaid range. Usually, however, the number of repetition should not exceed 10.

The process of the invention has the greatest effect when used in combination with the UV-curing cationic resin. It is understood, however, that the process of the invention may be applied not only to other photo-curing resins, for instance, an UV radical-curing resin, but also to yet other curing resins such as moisture-curing resins.

The process of the invention may also be applied to resins other than the curing type resins. In this case, drying should be carried out in place of curing. In other words, the light-transmitting layer is formed by repeating the coating and drying cycle a plurality of times. For the resin used herein, for instance, mention is made of a solvent diluted type of thermoplastic resin.

The thickness of the light-transmitting layer should preferably be selected from the range of 30 to 300 µm. Too thin a light-transmitting layer is susceptible to some considerable optical influence due to dust attracted on its surface. On the other hand, a light-transmitting layer having a thickness exceeding the aforesaid upper limit may be formed by injection molding or other molding processes.

The supporting substrate 20 is provided to maintain the rigidity of the medium. The substrate 20 has usually a thickness of 0.2 to 1.2 mm, and may be either transparent or opaque. An guide groove usually provided in an optical recording medium may be formed by transfer of a groove provided in the supporting substrate 20 during the formation of the light-transmitting layer, as shown in FIG. 1. The guide groove 21 shown in FIG. 1 is concave toward the side of the medium on which light is incident.

EXAMPLES

Example 1

Read only optical disk samples shown in Table 1 were prepared through the following process steps.

Sample No. 1

By sputtering, a reflective film made of an Al alloy was formed on the surface of a disk form of supporting substrate (a polycarbonate substrate of 120 mm in diameter and 1.2 mm in thickness) having asperities defining pits for carrying information thereon, as seen from the light-transmitting layer side.

Then, a resin (having a viscosity of 92 cps at 25° C.) containing an ultraviolet-curing cationic resin and a photo-polymerization initiator was coated on the surface of the reflective film by means of a dispenser, then spin-coated at 2,000 rpm for 2 seconds, and finally cured by ultraviolet irradiation. For the ultraviolet-curing cationic resin a mixture of alicyclic epoxy resins was used, and for the photo-polymerization initiator an aromatic sulfonium salt was used. This cycle of dispenser coating→spin coating→curing was repeated five times in all, thereby forming a light-transmitting layer.

By measurement, this light-transmitting layer was found to have a thickness of 100 µm at a position 40 mm away from the center of the supporting substrate in its diametrical direction.

Sample No. 2

This sample was prepared according to sample No. 1 with the exception that the cycle of dispenser coating→spin coating→curing was repeated three times. The light-transmitting layer was found to have a thickness of 100 µm at a position 40 mm away from the center of the supporting substrate in its diametrical direction.

Sample No. 3

This sample was prepared according to sample No. 1 with the exception that one cycle of dispenser coating→spin coating→curing was carried out. The light-transmitting layer was found to have a thickness of 100 µm at a position 40 mm away from the center of the supporting substrate in its diametrical direction.

Sample No. 4

An UV radical-curing acrylic resin (801SE-L6 made by Kyoritsu Chemical Industries Co., Ltd. with a viscosity of 900 cps at 25° C.) was coated on the surface of the supporting substrate used for sample No. 1 by means of a dispenser, then spin-coated at 2,000 rpm for 2 seconds, and finally cured by ultraviolet irradiation. This cycle of dispenser coating→spin coating→curing was repeated three times in all, thereby forming a light-transmitting layer which was found to have a thickness of 100 µm at a position 40 mm away from the center of the supporting substrate in its diametrical direction.

Sample No. 5

This sample was prepared according to sample No. 4 with the exception that one cycle of dispenser coating→spin coating→curing was carried out. The light-transmitting layer was found to have a thickness of 100 µm at a position 40 mm away from the center of the supporting substrate in its diametrical direction.

Sample No. 6

An acrylic type of ultraviolet-curing adhesive (DVD-003 made by Nippon Kayaku Co., Ltd.) was spin-coated on the surface of the supporting substrate used for sample No. 1 to form an adhesive layer of 30 µm in thickness thereon. Then, a polycarbonate sheet of 70 µm in thickness was bonded onto the adhesive layer to obtain a light-transmitting layer.

Estimation For each sample, the thickness profile of the light-transmitting layer (the maximum value—the minimum value) and the amount of warpage were measured. The results are given in Table 1. The thickness profile was measured, using a laser focus displacement meter made by Keyence. The amount of warpage was measured using a mechanical accuracy measuring device made by Ono Sokki Co, Ltd., while light was allowed to strike on the light-transmitting layer from the supporting substrate side. The measuring linear rate was 4 m/s.

To make an examination of to what degree the light-transmitting layer was cured, each sample was stored in an environment of 80° C. and 80% RH for 500 hours. After storage, the amount of warpage was measured and changes in the appearance of the sample were observed. The results are given in Table 1.

TABLE 1

| Sample No. | Resin Species | Number of Coating Cycle | Thickness Profile (µm) | Amount of Warpage (deg) Initial | Amount of Warpage (deg) Storage | Appearance of Sample After Storage |
|---|---|---|---|---|---|---|
| 1 | UV-Curing Cationic Resin | 5 | 4 | 0.20 | 0.25 | Nothing Abnormal |
| 2 | UV-Curing Cationic Resin | 3 | 4 | 0.27 | 0.30 | Nothing Abnormal |
| 3 | UV-Curing Cationic Resin | 1 | 13 | 0.33 | 0.39 | Nothing Abnormal |
| 4 | UV Radical-Curing Acrylic Resin | 3 | 6 | 0.90 | Unmeasurable | Many Cracks found in Reflective Film |

TABLE 1-continued

| Sample No. | Resin Species | Number of Coating Cycle | Thickness Profile (μm) | Amount of Warpage (deg) Initial | Amount of Warpage (deg) Storage | Appearance of Sample After Storage |
|---|---|---|---|---|---|---|
| 5 (comp.) | UV Radical-Curing Acrylic Resin | 1 | 25 | Unmeasurable | Unmeasurable | Many Cracks found in Reflective Film Peeling of Reflective Film |
| 6 (comp.) | Bonding of Polycarbonate Sheet | — | 8 | 0.60 | Unmeasurable | Nothing Abnormal |

From Table 1, the advantages of the invention are evident. More exactly, the samples wherein the light-transmitting layers are formed using the UV-curing cationic resin are found to be excellent in thickness uniformity and reduced in terms of the amount of warpage. Even when these sample are stored under the conditions of high temperature and humidity, their appearance shows nothing abnormal with little or no increase in the amount of warpage. The samples with the light-transmitting layers formed by repeating the cycle of resin coating and curing a plurality of times are strikingly improved in terms of the thickness uniformity of the light-transmitting layer, with a reduced amount of warpage. Especially when the cycle of coating and curing is repeated a plurality of times while the UV-curing cationic resin is used, the uniformity of thickness and the amount of warpage are much more improved.

The samples referred to as "unmeasurable" in Table 1 could not be measured due to too large warpage. Cracks in the reflective films and the peeling of the reflective film during storage under the conditions of high temperature and humidity are due probably to the migration of unreacted monomers and initiator to the reflective film side.

EFFECT OF THE INVENTION

In the present invention, the light-transmitting layer is formed by use of the ultraviolet-curing cationic resin, so that the thickness of the light-transmitting layer can be made uniform and the optical heterogeneity of the light-transmitting layer in its thickness direction can be reduced, and the warpage of the optical information medium can be prevented or avoided.

In the present invention, the light-transmitting layer is formed by repeating the cycle of resin coating and curing or drying a plurality of times, so that the uniformity of thickness of the light-transmitting layer can be improved and the amount of warpage can be reduced.

Japanese Patent Application No. 11-76963 is herein incorporated by reference.

Although some preferred embodiments of the invention have been described, many modifications and variations may be made thereto in the light of the above teachings. it is therefore to be understood that within the scope of the appended claims, the invention may be practiced otherwise than as specifically specified.

I claim:

1. An optical information medium comprising a supporting substrate, an information recording surface provided on the supporting substrate and a light-transmitting layer provided on the information-recording surface, with reproducing light incident on the information-recording surface through the light-transmitting layer, wherein:

said light-transmitting layer is obtained by curing a resin layer containing an ultraviolet curing cationic resin.

2. The optical information medium according to claim 1, wherein said light-transmitting layer has a thickness of 30–300 μm.

3. An optical information medium comprising a supporting substrate, an information-recording surface provided on the supporting substrate and a light-transmitting layer provided on the information-recording surface, with recording light incident on the information-recording surface through the light-transmitting layer, wherein:

said light-transmitting layer is obtained by curing a resin layer containing an ultraviolet-curing cationic resin.

4. The optical information medium according to claim 3, wherein said light-transmitting layer has a thickness of 30 to 300 μm.

5. A process of fabricating an optical information medium comprising a supporting substrate, an information-recording surface provided on the supporting substrate and a light-transmitting layer provided on the information-recording surface, with recording light incident on the information-recording surface through the light-transmitting layer, wherein said light-transmitting layer is formed by repeating a cycle of resin coating and resin curing a plurality of times.

6. In a process of fabricating an optical information medium comprising a supporting substrate, an information-recording surface provided on the supporting substrate and a light-transmitting layer provided on the information-recording surface, with reproducing light incident on the information-recording surface through the light-transmitting layer, the improvement comprising:

forming said light-transmitting layer by applying and curing a resin coating.

7. The method of claim 6, wherein said resin is an ultraviolet-curing cationic resin.

8. The method of claim 6, wherein forming said light-transmitting layer further comprises applying and drying a resin a plurality of times.

9. In a process of fabricating an optical information medium comprising a supporting substrate, an information-recording surface provided on the supporting substrate and a light-transmitting layer provided on the information-recording surface, with reproducing light incident on the information-recording surface through the light-transmitting layer, the improvement comprising:

forming said light-transmitting layer by applying and drying a resin coating.

10. The method of claim 9, wherein forming said light-transmitting layer further comprises applying and drying a resin a plurality of times.

11. A process of fabricating an optical information medium comprising a supporting substrate, an information-recording surface provided on the supporting substrate and a light-transmitting layer provided on the information recording surface, with recording light incident on the information-recording surface through the light-transmitting layer, wherein said light-transmitting layer is formed by repeating a cycle of resin coating and resin drying a plurality of times.

* * * * *